United States Patent [19]
DeGeeter et al.

[11] 3,897,115
[45] July 29, 1975

[54] CONTROL VALVE FOR HYDRAULIC CIRCUIT

[75] Inventors: Robert L. DeGeeter; George E. Schubert, both of Aurora, Ill.

[73] Assignee: Caterpillar Tractor Co., Peoria, Ill.

[22] Filed: Nov. 14, 1973

[21] Appl. No.: 415,721

[52] U.S. Cl. .................... 303/71; 303/13
[51] Int. Cl.² ...................... B60T 15/16
[58] Field of Search ............. 303/9, 13, 29, 40, 71

[56] References Cited
UNITED STATES PATENTS

| | | | |
|---|---|---|---|
| 3,366,142 | 1/1968 | Bueler | 303/13 X |
| 3,511,276 | 5/1970 | Jessen et al. | 303/13 UX |
| 3,519,312 | 7/1970 | Cruse | 303/13 |
| 3,746,401 | 7/1973 | Stearns | 303/13 X |

*Primary Examiner*—Duane A. Reger
*Attorney, Agent, or Firm*—Phillips, Moore, Weissenberger, Lempio & Strabala

[57] ABSTRACT

Control valve means for automatic and manual control of fluid flow in a hydraulic circuit supplying a parking brake. The control valve means includes detent means for engaging a valve member to automatically permit fluid flow to brake with normal fluid pressure in the hydraulic circuit. The detent means are manually disengageable to reduce fluid pressure in the brake mechanism to engage the brake. Upon an inordinate pressure reduction in the hydraulic circuit, the detent means automatically release to allow engagement of the parking brake.

11 Claims, 2 Drawing Figures

3,897,115

CONTROL VALVE FOR HYDRAULIC CIRCUIT

BACKGROUND OF THE INVENTION

This invention relates to control valve means for use in hydraulic circuits. In particular, the invention relates to control valve means for use in hydraulic circuits supplying pressurized fluid to a spring actuated pressure released parking brake which permits manual and automatic control of the parking brake.

Typically, vehicles are equipped with a parking brake system which supplements the primary service braking system to insure the safety of the vehicles and their operators. Conventionally, the parking brake system provides for automatic mechanical application of the parking brake in response to certain conditions to eliminate the hazard of operator forgetfulness. For example, many brake systems commonly use spring-actuated pressure released mechanisms in which loss of brake-actuating pressure automatically actuates the spring members to apply the brake. An example of such a system is provided in U.S. Pat. No. 3,168,353 to Horowitz.

It is frequently desirable, however, to be able to manually override such automatic braking systems, as, for example, when it is desired to engage the parking brake without shutting down the engine of the vehicle. Such situations often occur during log-skidding operations when the driver of the log skidder machine frequently must leave his machine to affix a cable around the load for towing to an off loading area. Since these operations often take place on a slope or hillside, it is desirable for safety reasons for the operator to manually engage the parking brake before leaving the machine.

SUMMARY AND OBJECTS OF THE INVENTION

This invention provides control valve means for regulating fluid flow in a hydraulic circuit supplying pressurized fluid to a pressure released parking brake. The control valve means provides automatic or manual regulation of fluid flow to the braking mechanism. The control valve means further provides means for automatically preventing permanent manual disengagement of the parking brake members in the event fluid pressure in the hydraulic circuit drops below a predetermined level.

It is an object of this invention to provide control valve means for regulating fluid flow within a brake circuit whereby actuation of parking brake members may be manually and automatically controlled.

It is another object of this invention to provide simple and economical means for automatically and manually controlling fluid actuation of parking brake members in a brake circuit.

It is a further object of this invention to provide control valve means for regulating fluid flow automatically or manually within a brake circuit and for automatically counteracting the manual disengagement of parking brake members when fluid pressure within the associated hydraulic circuit drops to an unsafe level.

Other objects and advantages of the invention will be apparent from the following description and drawing:

DETAILED DESCRIPTION

Figure 1:
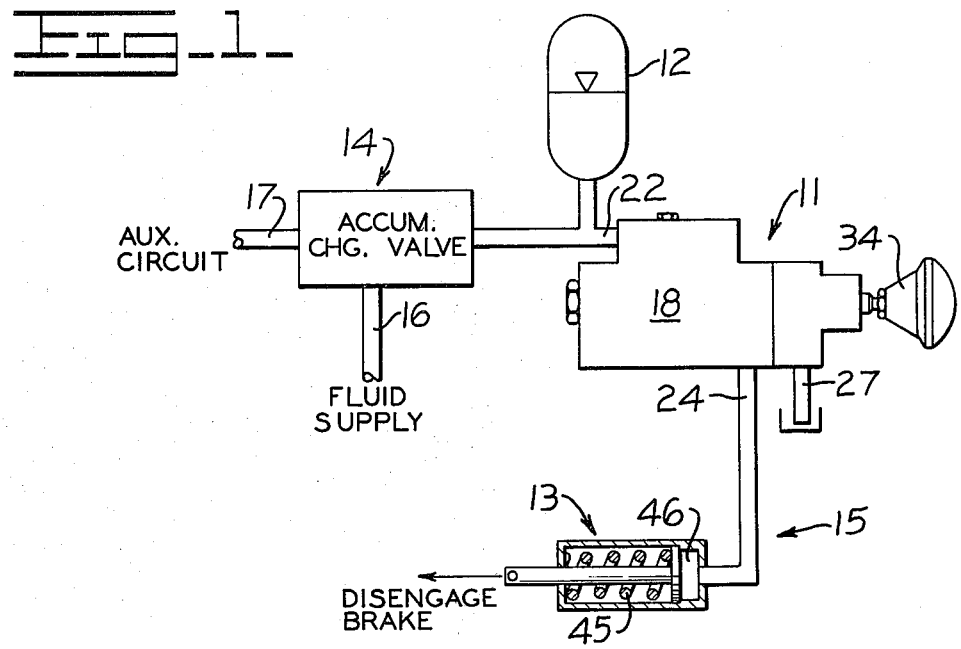
FIG. 1 is a fragmentary schematic diagram of a hydraulic circuit including the control valve means of this invention.

With particular reference to FIG. 1, a portion of a vehicle hydraulic circuit is shown having the present control valve means at 11. Accumulator means 12 are provided for storing circuit fluid under pressure and a charging valve means 14 is provided for regulating fluid flow to the accumulating means 12. A brake circuit shown generally at 15 includes conventional brake actuating means 13 with a compression spring 45 and pressure chamber for actuating parking brake members (not shown). Fluid is supplied to the circuit by a fluid source (not shown) through a conduit 16 for communicating flow from the supply source to the charging valve 14. Fluid flow is directed from the fluid supply source to the circuit through the charging valve until the accumulator 12 is fully charged at which time fluid is redirected to an auxiliary circuit (not shown) such as a steering circuit, through a conduit 17.

Figure 2:
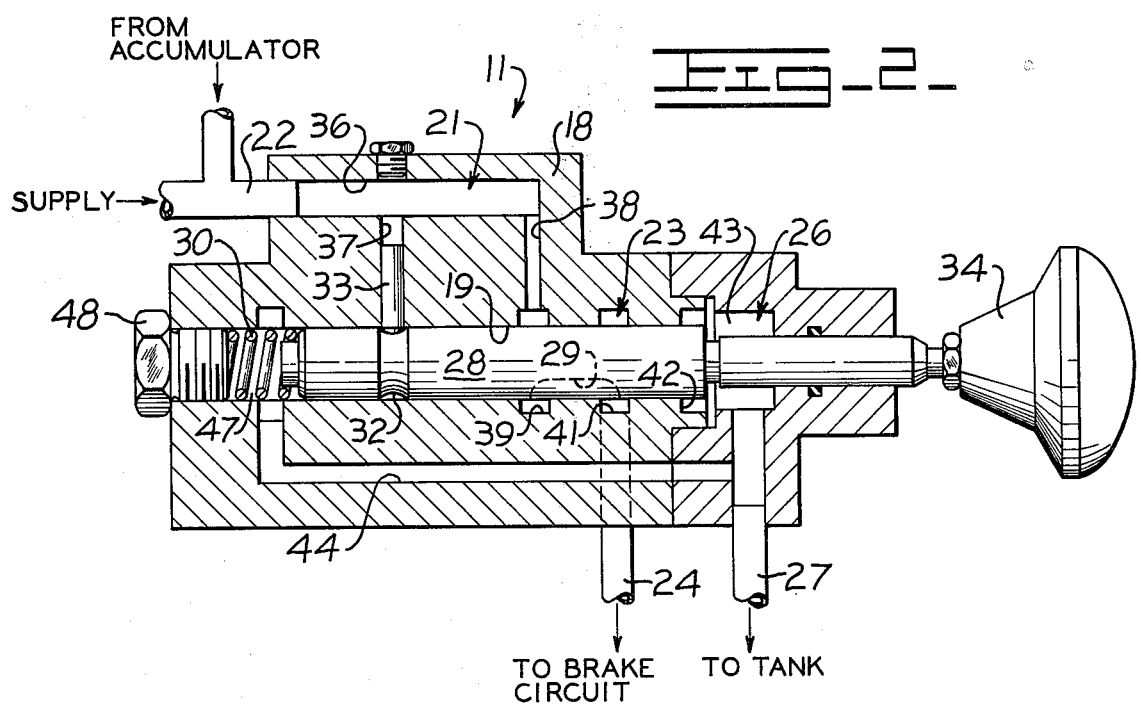
FIG. 2 is a longitudinal cross-sectional elevation of the control valve means of FIG. 1.

With particular reference to FIG. 2, the control valve means 11 has a valve body 18 with a bore 19 therein. The bore 19 communicates with the accumulator 12 and the fluid supply source via a first passage means 21 in the valve body. Communication means 22 are provided for communicating flow from the accumulator 12 to the first passage means 21. The bore 19 communicates with the brake actuating mechanism 13 through second passage means 23 and flow communication means 24. The bore 19 also communicates with a drain tank via third passage means 26 within the valve body 18, and flow communication means 27.

A valve member such as a spool 28 is disposed within the bore 19 and is biased rightwardly within the body 18 by a spring means 30 within a chamber 47 closed by a cover member 48. The valve spool 28 is slideably positionable within the bore 19 so that in a first valve position, as illustrated, the first passage means 21 communicates with the second passage means 23 via a longitudinal slot 29 and flow is directed from the source to the brake actuating mechanism 13 via the communication means 22, first passage means 21, slot 29, second passage means 23, and flow communication means 24. At the same time, flow is blocked between the second passage means 23 and the third passage means 26 so that flow is prevented from the accumulator 12 to the drain tank.

The valve spool 28 is further positionable within the bore 19 to a second valve position wherein the second passage means 23 and the third passage means 26 communicate via the slot 29 and flow from the brake actuating means 13 is communicated to drain via the flow communication means 24, second passage means 23, third passage means 26, and the flow communication means 27. At such time, flow is prevented between the first passage means 21 and the second passage means 23, thus isolating the accumulator 12 from the brake actuating means 13.

The control valve means 22 includes detent means comprising a detent groove 32 in the valve member 28 and a plug member 33 moveably disposed within a passage 37 of the first passage means 21 for relatively forceful engagement with the groove 32 in response to the existence of a predetermined high pressure in the first passage means 21. The control valve means 11 further includes manual valve positioning means such as a knob 34 or the like for manual movement of the spool and selective disengagement of the detent means.

In the preferred embodiment, the first passage means 21 includes a passage 36 having a first branch 37 for accommodating the plug member 33 and a second branch 38 terminating in a first annulus 39 around the valve member 28. Also preferably, the second passage means 23 includes a second annulus 41, and the third passage means 26 includes a third annulus 42 disposed around valve member 28 and communicating with an enlarged chamber 43 in communication with the means 27. The slot 29 is so disposed such that positioning of the valve member 28 in the above described first position puts the first and second annuli in communication via the slot, and positioning of the valve member 28 in the above described second position puts the second and third annuli in communication via the slot. Preferably, drain means 44 are also provided in the valve body 18 for communicating between the drain tank and the spring chamber 47. The drain means 44 provide an egress from the chamber 47 for any fluid which might accumulate therein through leakage around the member 28 to retard movement of the member 28 toward the left, as shown.

OPERATION

When it is desired to manually set the parking brake, the operator pulls the knob 34 and thereby disengaging the detent means 32, 33 and places the member 28 in the second valve position. This communicates the chamber 46 of the actuating means 13 with the drain tank via the flow communication means 24, the second annulus 41, the slot 29, the third annulus 42, the chamber 43, and the flow communication means 27, to thereby allow the spring 45 to apply the parking brake.

To release the brake, the procedure is reversed. The knob means 34 is pushed inwardly against the biasing force of spring 30 until the detent groove 32 engages the plug member 33 to nominally retain the valve spool 28 in the aforementioned first valve position. Fluid flow is then communicated from the accumulator means 12 to the brake releasing chamber 46 to thereby oppose the bias of spring 45 and disengage the parking brake members.

In the event a dangerously low pressure condition should exist within the flow communication means 22 insufficient fluid pressure would be present in the first branch 37 to hold the plug member 33 within the detent groove 32 and retain the spool member. The spool member 28 would, therefore, return to the second valve position under the influence of the force of the spring 30 thereby blocking communication between the accumulating means 12, and the brake actuating means and preventing the accidental or inadvertent release of the parking brake.

It should be noted however, that with low fluid pressure in the flow communication means 22 and the valve member 28 in the second valve position, emergency manual release of the parking brake could be effected, provided some pressure still exists in the circuit, to allow the vehicle to be towed or the like.

While the invention has been described with particular reference to the preferred embodiment, it is apparent that variations and modifications are possible within the purview of the inventive concepts. No limitation with repsect to such variations and modifications is intended, except by the scope of the appended claims.

We claim:

1. Control valve means for controlling a hydraulic circuit supplying fluid to an automatically actuated-pressure released brake including; a valve body having a bore means therein, first passage means in said valve body for communicating said bore means with a fluid supply source for said hydraulic circuit, second passage means in said valve body for communicating said bore means with said pressure released brake, third passage means communicating said bore means with a drain means, valve member means disposed within said bore means positionable in a first position for communicating fluid between said first passage means and said second passage means while concurrently preventing fluid flow between said second passage means and said third passage means, said valve member means being further positionable in a second position for communicating fluid between said second passage means and said third passage means while concurrently preventing fluid flow between said first passage means and said second passage means, said valve member means including means for allowing said valve member means to be automatically positionable in said second position upon the attainment of a predetermined low level of fluid pressure in said hydraulic circuit, said valve member means being further manually movable to said second position and said first position, said valve member means in said first position communicating said fluid supply source with said pressure released brake to release said brake and said valve member means in said second position communicating said brake with said drain means for automatically engaging said brake.

2. Control valve means for controlling a hydraulic circuit supplying fluid to an automatically actuated-pressure released brake including; a valve body having a bore means therein, first passage means in said valve body for communicating said bore means with a fluid supply source for said hydraulic circuit, second passage means in said valve body for communicating said bore means with said pressure released brake, third passage means communicating said bore means with a drain means, valve member means disposed within said bore means positionable in a first position for communicating fluid between said first passage means and said second passage means while concurrently preventing fluid flow between said second passage means and said third passage means, said valve member means being further positionable in a second position for communicating fluid between said second passage means and said third passage means while concurrently preventing fluid flow between said first passage means and said second passage means, said valve member means being automatically positionable in said second position upon the attainment of a predetermined low level of fluid pressure in said hydraulic circuit, said valve member means being further manually movable to said second position and said first position, said valve member means in said first position communicating said fluid supply source with said pressure released brake to release said brake and said valve member means in said second position communicating said brake with said drain means for automatically engaging said brake, detent means associated with said bore means and said valve member means for nominally mechanically retaining said valve member means in said first position when said pressure in said hydraulic circuit is above said predetermined low level.

3. The invention of claim 2 wherein said first passage means include a first branch passage communicating with said bore means, said detent means including a plug member disposed within said first branch passage and projecting into said bore means.

4. The invention of claim 3 wherein said detent means further include groove means in said valve member means for nominally engaging said plug member when said valve member means are disposed in said first position.

5. The invention of claim 4 wherein said plug member has a first surface exposed directly to the pressure in said first passage means, said plug member being biased into engagement with said groove means by the application of fluid pressure to said first surface, said detent means being ineffective to retain said valve member means in said first position when said pressure on said first surface is less than said predetermined low level.

6. Control valve means for controlling a hydraulic circuit supplying fluid to an automatically actuated-pressure released brake including; a valve body having a bore means therein, first passage means in said valve body for communicating said bore means with a fluid supply source for said hydraulic circuit, second passage means in said valve body for communicating said bore means with said pressure released brake, third passage means communicating said bore means with a drain means, valve member means disposed within said bore means positionable in a first position for communicating fluid between said first passage means and said second passage means while concurrently preventing fluid flow between said second passage means and said third passage means, said valve member means being further positionable in a second position for communicating fluid between said second passage means and said third passage means while concurrently preventing fluid flow between said first passage means and said second passage means, said valve member means being automatically positionable in said second position upon the attainment of a predetermined low level of fluid pressure in said hydraulic circuit, said valve member means being further manually movable to said second position and said first position, said valve means in said first position communicating said fluid supply source with said pressure released brake to release said brake and said valve member means in said second position communicating said brake with said drain means for automatically engaging said brake, said first passage means including a first branch passage and a second branch passage axially spaced apart from said first branch passage and in communication with said bore means, said first passage means further including first annular groove means within said bore means in surrounding relation to said valve member means and in direct communication with said second branch passage.

7. The invention of claim 6 wherein said second passage means include second annular groove means within said bore means in surrounding relation to said valve member means and in direct communication with said automatically actuated-pressure released brake.

8. The invention of claim 7 wherein said third passage means include third annular groove means within said bore means in surrounding relation to said valve member means and in direct communication with said drain means.

9. The invention of claim 7 wherein said valve member means include longitudinal slot means for extending axially along said valve member means and for communicating said first annular groove means with said second annular groove means when said valve member means is disposed in said first position.

10. The invention of claim 8 wherein said valve member means include longitudinal slot means for communicating said second annular groove means with said third annular groove means when said valve member means is disposed in said second position.

11. The invention of claim 1 wherein said valve member means include a valve spool having a plurality of lands thereon, and an extension portion attached to said valve spool and extending without said valve body, said extension portion having a manually manipulatable knob thereon, spring means within said bore means for constantly urging said valve spool toward said second position.

* * * * *